United States Patent
Filippi et al.

(10) Patent No.: US 11,424,636 B2
(45) Date of Patent: Aug. 23, 2022

(54) MICRO-GRID SMART OUTPUT ADAPTOR

(71) Applicant: Ford Global Technologies, LLC, Dearborn, MI (US)

(72) Inventors: Theodore Joseph Filippi, Brownstown, MI (US); Allan Roy Gale, Livonia, MI (US); Ke Zou, Canton, MI (US); Jacek Brauner, Plymouth, MI (US); Krishna Prasad Bhat, Canton, MI (US); Michael W. Degner, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 298 days.

(21) Appl. No.: 16/116,408

(22) Filed: Aug. 29, 2018

(65) Prior Publication Data

US 2020/0076217 A1 Mar. 5, 2020

(51) Int. Cl.
*H02J 7/00* (2006.01)
*H02J 5/00* (2016.01)
*B60L 1/00* (2006.01)

(52) U.S. Cl.
CPC .............. *H02J 7/0068* (2013.01); *B60L 1/00* (2013.01); *H02J 5/00* (2013.01)

(58) Field of Classification Search
CPC ...... H01R 29/00; H01R 13/465; H01R 27/00; H01R 27/02; H01R 31/06; H01R 2201/26; H02M 7/003
See application file for complete search history.

(56) References Cited

U.S. PATENT DOCUMENTS

| | | | | |
|---|---|---|---|---|
| 3,034,000 A | * | 5/1962 | Todd | B26B 19/38 200/51 LM |
| 6,061,261 A | * | 5/2000 | Chen | H01R 13/6675 363/146 |
| 7,619,868 B2 | * | 11/2009 | Spitaels | H01R 25/003 361/115 |
| 7,960,857 B2 | * | 6/2011 | King | B60L 11/1816 307/10.1 |
| 9,172,245 B1 | | 10/2015 | Lentine et al. | |
| 9,207,735 B2 | | 12/2015 | Khaitan et al. | |
| 9,511,676 B2 | * | 12/2016 | Loftus | H02J 7/0065 |
| 9,948,138 B2 | | 4/2018 | Motsenbocker | |
| 2005/0184856 A1 | * | 8/2005 | Pourchot | H01R 13/7038 340/5.61 |
| 2009/0192927 A1 | * | 7/2009 | Berg | G06Q 30/04 705/34 |
| 2010/0276993 A1 | * | 11/2010 | King | B60L 11/12 307/9.1 |
| 2013/0096760 A1 | * | 4/2013 | Izumi | B60L 3/0046 701/22 |

* cited by examiner

*Primary Examiner* — Kyle J Moody
(74) *Attorney, Agent, or Firm* — David B. Kelley; Brooks Kushman P.C.

(57) ABSTRACT

A system for a vehicle includes a converter configured to, responsive to a first signal from a first adaptor indicating a first plug type having a first electrical parameter configuration, output power to the adaptor according to the first electrical parameter configuration, and responsive to a second signal from a second adaptor indicating a second plug type having a second electrical parameter configuration, output power to the adaptor according to the second configuration.

14 Claims, 4 Drawing Sheets

MICRO-GRID SMART OUTPUT ADAPTOR

TECHNICAL FIELD

The present disclosure relates to systems and methods for a smart output adaptor for an electric or hybrid-electric vehicle.

BACKGROUND

A hybrid or an electric vehicle may be equipped with at least one traction battery configured to provide energy for propulsion. The traction battery may also provide energy for other vehicle electrical components. For example, the traction battery may transfer energy to high voltage loads, such as compressors and electric heaters. In another example, the traction battery may provide energy to low voltage loads.

SUMMARY

A system for a vehicle includes a converter configured to, responsive to a first signal from a first adaptor indicating a first plug type having a first electrical parameter configuration, output power to the adaptor according to the first electrical parameter configuration, and responsive to a second signal from a second adaptor indicating a second plug type having a second electrical parameter configuration, output power to the adaptor according to the second configuration.

A system for a vehicle includes a converter configured to, responsive to different signals from different types of adaptors installed at different times, each adaptor defining a different plug type and a different electrical configuration from those of one another, output power according to both the corresponding plug type and the corresponding electrical configuration of the adaptor.

A system for a vehicle includes a traction battery and a voltage converter connected to the battery, and a voltage converter that selectively connects to one of a plurality of electrical adaptors, the converter configured to transfer, from the battery, voltage and current according to the connected adaptor to power an electrical load external to an electrical system of the vehicle.

DETAILED DESCRIPTION

Figure 1:
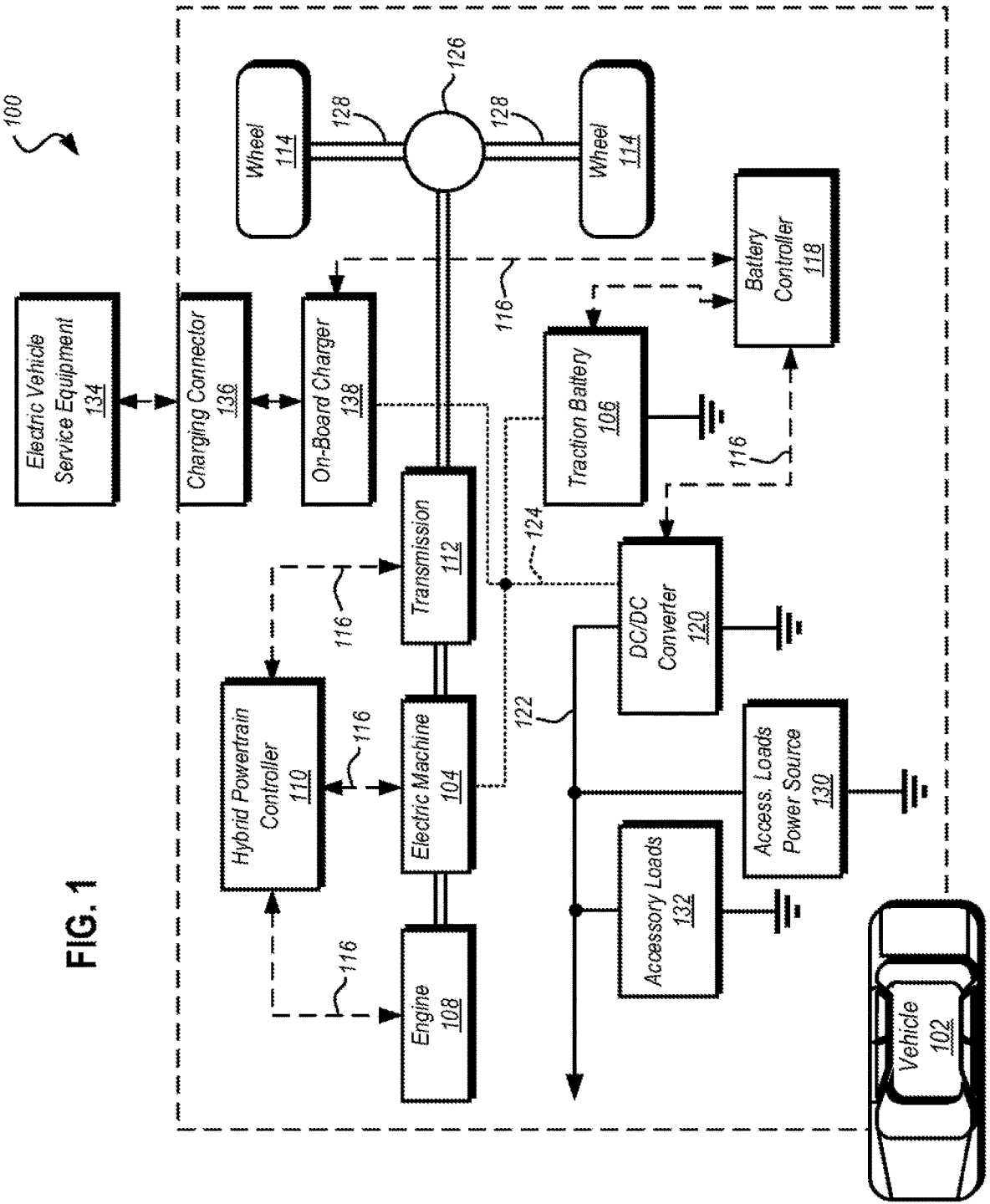
FIG. 1 is a block diagram illustrating a plug-in hybrid electric vehicle (PHEV)

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Different electrical power applications may necessitate different electrical connector styles and/or different levels of voltage or current, including, but not limited to, single- or three-phase AC voltage, DC voltage, and so on. Vehicles including a traction battery may be configured to power one or more electrical loads external to the vehicle, e.g., external to an electrical system of the vehicle. Such vehicle micro-grid systems may be limited in their ability to output different levels of voltage and current multiple voltage and current, i.e., voltage and current output levels according to those necessary to operate different electrical loads connected thereto. In some instances, a different voltage convertor and a different electrical connector type may need to be connected to the vehicle micro-grid system for each power application. This may complicate overall system and may clutter the vehicle micro-grid output interface with multiple convertors and connectors. Additionally or alternatively, some power applications may be enhanced through application of a ground fault circuit interrupt (GFCI) and/or circuit breaker protection device. This may add further complexity to the vehicle micro-grid system and may increase cost of the system design.

In some instances, one or more micro-grid smart output adaptor may be configured to output different voltages and currents received from a same reconfigurable converter while providing safety features to the user and equipment. The micro-grid smart output adaptor may be configured to interface with a power convertor. Each of the adaptors may be electrically connected to and in communication with a reconfigurable power convertor. In example, the smart adaptor may be configured to send a signal to the convertor indicative of a request for a predefined value of output voltage and/or current. In some instances, the converter may be configured to output to the adaptor one or more of three-phase AC voltage values, single-phase AC voltage values, and DC voltage values.

The micro-grid smart output adaptor may be further configured to adjust or otherwise change the output to whatever configuration is required for the user application. The smart output adaptors may have the same connection interface with one another, where the connection interface to the reconfigurable convertor. The user side (output) of the smart adaptor(s) will be unique and suited to the voltage and current required by the application.

The smart adaptor may include ground fault circuit interrupt and circuit breaker protection device, such that when absolute value of current output by the adaptor is greater to a threshold the output circuit connection may be interrupted. This configuration allows for easy serviceability and access should the GFCI or circuit breaker trip or get damaged during use. The adaptor may be configured to provide feedback to the convertor indicative of fault detection, output status, and other diagnostics.

A micro-grid system may be configured to output one of a plurality of single-phase and three-phase voltages and currents. The micro-grid system may include one or more smart adaptors, each adaptor being configured to deliver one or more different output power values. In one example, connecting a first adaptor to the converter such that the first adaptor sends a signal to the converter indicative of a request to deliver a single-phase 120-VAC voltage and 15-A current output. Responsive to the request signal, the converter may be configured to output the requested single-phase 120-VAC voltage and 15-A current to the first adaptor that may, in turn, power one or more electrical loads external to the vehicle. In another example, connecting a second adaptor to the converter such that the second adaptor sends a signal to the converter indicative of a request to output three-phase 208-VAC 20-A. Responsive to the second request signal, the converter may be configured to output the requested three-phase 208-VAC voltage and 20-A current to the second adaptor that may, in turn, power electrical loads external to the vehicle.

FIG. 1 illustrates an example system 100 for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller 110 configured to monitor and control 116 operation of one or more components of the vehicle 102.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving three applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. The traction battery 106 may comprise a plurality of battery cells (not illustrated), e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the hybrid powertrain controller 110 and may command to charge and discharge the traction battery 106 responsive to one or more signals from the hybrid powertrain controller 110. As described in further detail in reference to at least FIG. 2, the powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media oriented system transfer (MOST), as some examples.

The battery controller 118 may be further configured to receive signals from a plurality of vehicle 102 sensors, such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 off charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charging connector 122 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate traction battery 106 charging responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more high-voltage loads (not illustrated), e.g., compressors and electric heaters, that operate using voltages greater than 50V.

The traction battery 106 may be configured to provide energy to a low voltage DC supply that is compatible with other vehicle loads. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may have associated operating voltage greater than operating voltage associated with the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the hybrid powertrain controller 110. In some instances, the low voltage subsystems or components electrically connected with one another and with other portions of the vehicle 102 electrical distribution network via the low voltage connection 122 may be generally referred to as a low voltage bus.

Figure 2:
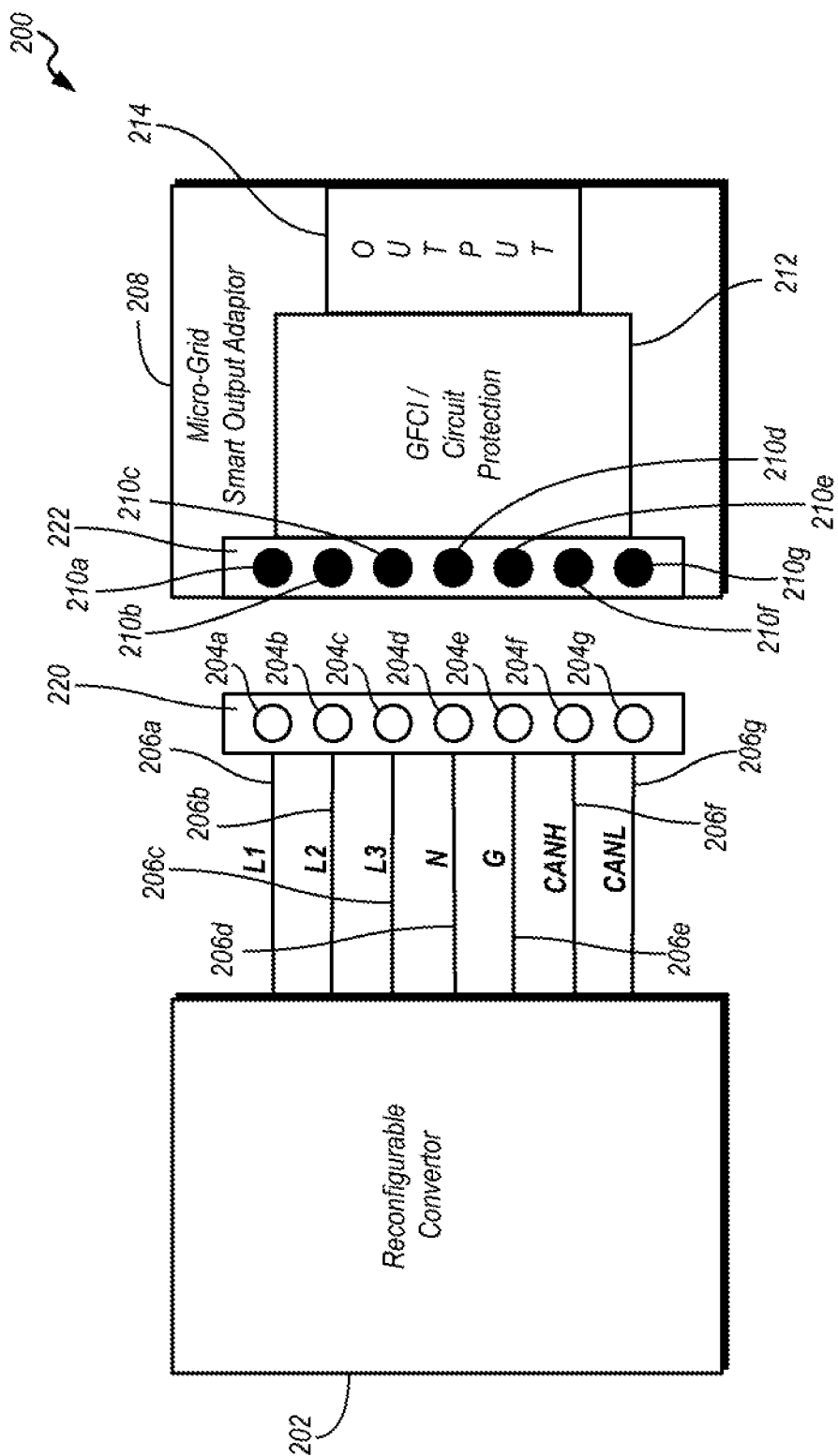
FIG. 2 is a block diagram illustrating a smart output adaptor.

FIG. 2 illustrates an example power system arrangement 200 for the vehicle 102. In one example, the battery controller 118, or another controller of the vehicle 102, may connect to a reconfigurable power converter (hereinafter, reconfigurable converter) 202. The reconfigurable converter 202 may be configured to transfer power from the traction battery 106 to an electrical load external to the vehicle 102. In one example, the reconfigurable converter 202 may transfer power from the traction battery 106 to the electrical load via a micro-grid smart output adaptor 208.

In one example, the reconfigurable converter 202 may include a connector interface 220 configured to electrically connect with a corresponding interface 222 of the adaptor 208. In some instances, the converter interface 220 may define a plurality of openings 204, each opening 204 configured to permit electrical connection to one of a plurality of terminals 206. In some instances, the terminals 206 may include one or more line voltage terminals 206a, 206b, 206c, a neutral terminal 206d, a ground terminal 206e, and one or more controller area network (CAN) terminals 206f, 206g. More or fewer terminals and different terminal types, such as, a power terminal, electrical bus terminal, and signal and chassis ground terminals, are also contemplated.

The adaptor 208 may be selectively coupled to the reconfigurable converter 202 to provide predefined voltage and current values to an electric load connected thereto. In one example, the adaptor interface 222 of the adaptor 208 may include a plurality of adaptor terminals 210, such that each terminal 210 nests inside one of the openings 204 of the reconfigurable converter 202 when the adaptor 208 is coupled to the reconfigurable converter 202. Accordingly, when the adaptor 208 is coupled to the converter 202, each terminal 210 electrically connects to one of the terminals 206, via the corresponding opening 204.

The terminals 210 of the adaptor 208 may be configured to transfer electric energy received from the reconfigurable converter 202 to an electrical load external to the vehicle 102. As one example, the adaptor 208 may include an adaptor output interface 214 electrically connected with the terminals 210. As further described in reference to at least FIGS. 3A-3T the adaptor output interface 214 may define several configurations, arrangements, or layouts and may be connectable to electrical connector plug of an electric load external to the vehicle 102 to selectively transfer predefined current and voltage values thereto.

In some examples, the adaptor 208 may include a ground fault circuit interrupt (GFCI) and circuit protection device 212 electrically connected between the adaptor input interface 222 and the adaptor output interface 214. Other configurations and arrangements for the adaptor 208 are also contemplated. In some instances, the adaptor 208 may include more or fewer openings 210 configured to electrically connect with corresponding terminals 206 of the converter 202, such that the adaptor output 214 transfers predefined voltage and current values to an electrical load connected thereto.

Figure 3:
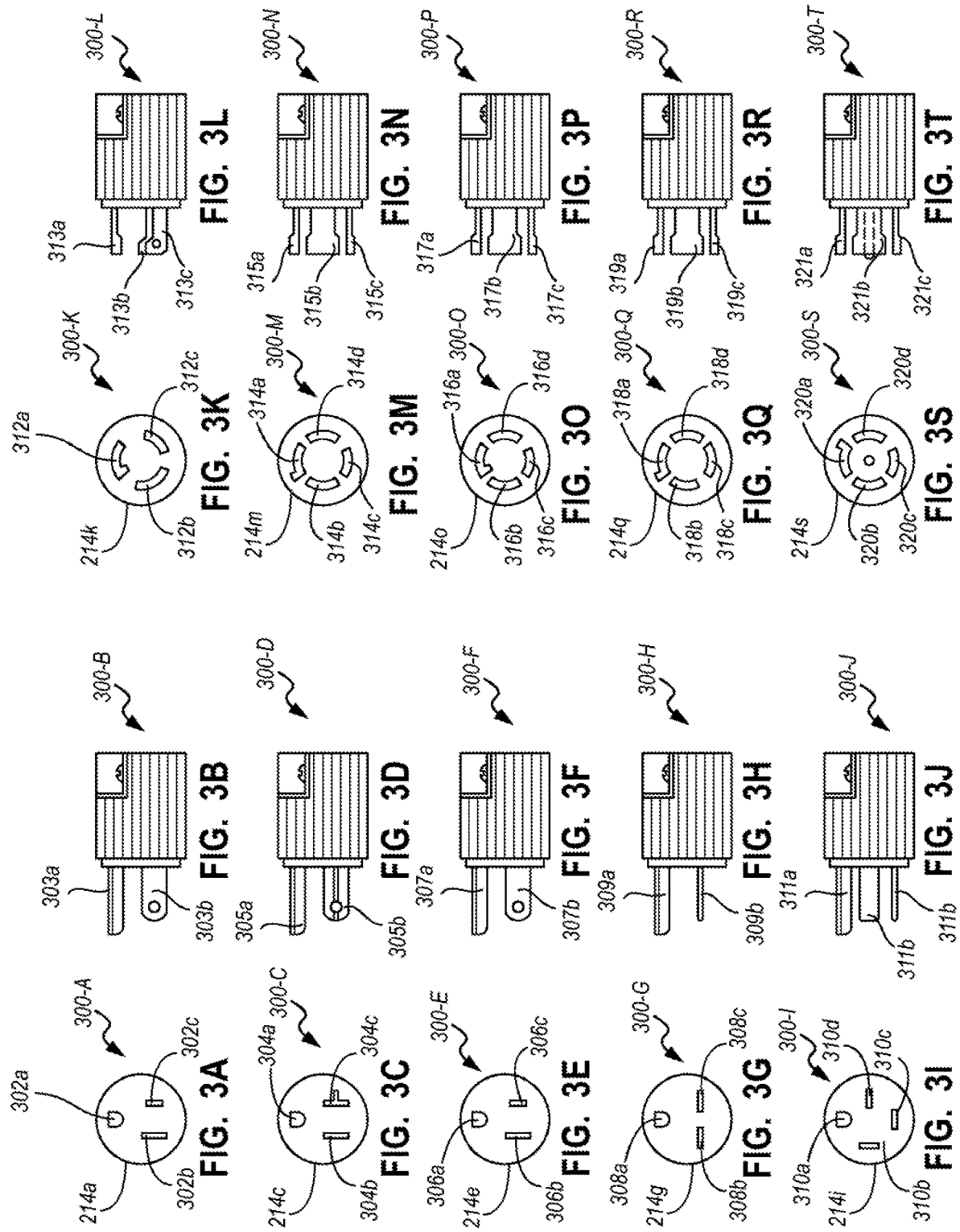
FIGS. 3A-3T are example adaptor output interfaces and corresponding electrical power application connector plugs.

FIGS. 3A-3T illustrate example configurations of adaptor output interfaces 214 and corresponding power application connectors that may be selectively coupled thereto. The adaptor output interface 214, via an electrical connection between the terminals 206 of the reconfigurable converter 202 and the terminals 210 of the adaptor 208, may transfer predefined voltage and current values to an electrical load connected to the adaptor output interface 214. Accordingly, when the adaptor 208 is coupled to the reconfigurable converter 202, e.g., via a connection between the terminals 210 and the terminals 206, and the electrical connector of a given power appliance is connected to the adaptor 208 via the adaptor output interface 214, the adaptor 208 may transfer between the reconfigurable converter 202 and the electrical connector of the electrical load. Additionally or alternatively, the adaptor 208 may use a configuration of the adaptor output interface 214 to determine a combination of electrical parameters to be provided by the reconfigurable converter 202 to the electrical load external to the vehicle 102.

As one example, FIG. 3A illustrates a front view 300-A of a first adaptor output interface 214a that may be selectively coupled to a power appliance via a corresponding connector 300-B, illustrated in FIG. 3B, to provide a first combination of electrical parameters. The first adaptor output interface 214a may include a plurality of recesses 302a, 302b, and 302c configured to receive one of electrical terminals 303 of the connector 300-B. When the adaptor 208 is coupled to the reconfigurable converter 202 and the electrical connector 300-B is connected to the adaptor 208 (e.g., via the adaptor output interface 214a), the recesses 302 may enable energy transfer between the reconfigurable converter 202 and the electrical connector 300-B via the adaptor output interface 214a. Thus, the terminals 303 inserted into the recesses 302 of the output interface 214a may be configured to receive power from the vehicle 102 electrically connected thereto.

As another example, FIG. 3C illustrates a front view 300-C of a second adaptor output interlace 214c that may be selectively coupled to an electrical load external to the vehicle 102 via a corresponding second connector 300-D, as illustrated in FIG. 3D, to provide a second combination of electrical parameters different from the first combination of electrical parameters. The second adaptor output interlace 214c may include a plurality of recesses 304a, 304b, and 304c configured to receive one of electrical terminals 305 of the connector 300-D. When the adaptor 208 is coupled to the reconfigurable converter 202 and the electrical connector 300-D is connected to the adaptor 208 (e.g., via the adaptor output interface 214c), the recesses 304 may enable energy transfer between the reconfigurable converter 202 and the electrical connector 300-D via the adaptor output interface 214c. Thus, the terminals 305 inserted into the recesses 302 of the output interlace 214c may be configured to receive power from the vehicle 102 electrically connected thereto.

Additionally or alternatively, front views 300-E, 300-G, 300-I, 300-K, 300-M, 300-O, 300-Q, and 300-S of a plurality of configurations of the adaptor output interfaces 214, as illustrated in FIGS. 3E, 3G, 3I, 3K, 3M, 3O, 3Q, and 3S, respectively, may be selectively coupled to an electrical load external to the vehicle 102 via corresponding connectors 300-F, 300-H, 300-J, 300-L, 300-N, 300-P, 300-R, and 300-T, as illustrated in FIGS. 3F, 3H, 3J, 3L, 3N, 3P, 3R, and 3T, respectively. As some examples, recesses 306 of the interface 214e may be configured to mate with corresponding connector terminals 307, recesses 308 of the interface 214g—with corresponding connector terminals 309, recesses 310 of the interface 214i—with corresponding terminals 311, recesses 312 of the interface 214k—with corresponding terminals 313, recesses 314 of the interface 214m—with corresponding terminals 315, recesses 316 of the interface 214o—with corresponding terminals 317, recesses 318 of the interface 214q—with corresponding terminals 319, and recesses 320 of the interface 214s—with corresponding terminals 321. The adaptor 208 may be configured to provide a predefined combination of electrical parameters based on the adaptor output interface 214 being used. The adaptor output interfaces 214e, 214g, 214i, 214k, 214m, 214o, 214q, and 214s may each provide a combination of electrical parameters different from that of one another and from the first and second combinations of electrical parameters of the first and second adaptor output interfaces 214a, 214c, respectively.

As some non-limiting examples, the first adaptor output interface 214a may be configured to output a first electrical configuration including 125V/15 A two-pole and three-wire grounding output; the second adaptor output interface 214c may be configured to output a second electrical configuration including 125V/20 A two-pole and three-wire grounding output; the third adaptor output interface 214e may be configured to output a third electrical configuration including 125V/50 A two-pole and three-wire grounding output; the fourth adaptor output interface 214g may be configured to output a fourth electrical configuration including 250V/15 A two-pole and three-wire grounding output; the fifth adaptor output interface 214i may be configured to output a fifth electrical configuration including 250V/50 A three-pole and four-wire grounding output; the sixth adaptor output interface 214k may be configured to output a sixth electrical configuration including 125V/30 A two-pole and three-wire grounding output; the seventh adaptor output interface 214m may be configured to output a seventh electrical configuration including 125V-250V/20 A three-pole and four-wire grounding output; the eighth adaptor output interface 214*o* may be configured to output an eighth electrical configuration including 125V-250V/30 A three-pole and four-wire grounding output; the ninth adaptor output interface 214*q* may be configured to output a ninth electrical configuration including 250V/20 A three-pole and four-wire grounding output; and the tenth adaptor output interface 214*s* may be configured to output a tenth electrical configuration including 208 VAC/20 A four-pole and five-wire grounding output.

Figure 4:
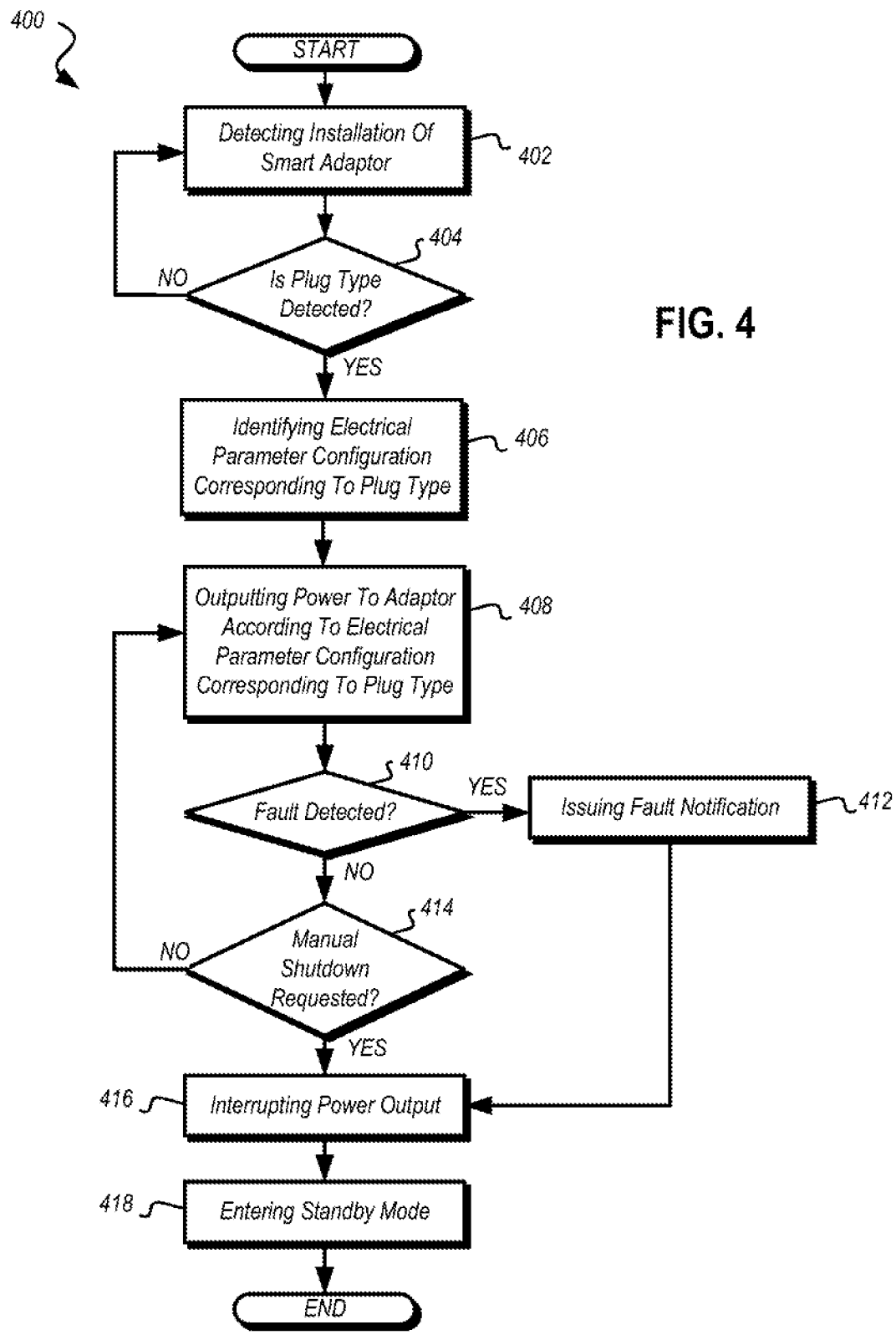
FIG. 4 is a flowchart illustrating an algorithm for transferring power using a micro-grid smart output adaptor.

FIG. 4 illustrates an example process 400 for changing vehicle output power according to electrical parameter configuration of an adaptor plug type. One or more operations of the process 400 may be instructions stored in volatile or non-volatile memory and executable by a processor of one or more controllers of the vehicle 102. In one example, the process 400 may be executed by a processor of the reconfigurable converter 202. The process 400 may begin at block 402 where the reconfigurable converter 202 detects that a first adaptor 208 has been connected, e.g., the adaptor interface 222 has been coupled to the converter interface 220.

At block 404, the reconfigurable converter 202 may determine whether a plug type of the connected adaptor 208 has been detected. In one example, the reconfigurable converter 202 may detect the plug type based on a signal from the first adaptor 208 indicative of a first plug type. If the plug type has not been detected, the reconfigurable converter 202 may return to block 402 where the converter 202 may await to detect installation of the smart adaptor 208.

Responsive to detecting the plug type, the reconfigurable converter 202 at block 406 identifies electrical parameter configuration corresponding to the detected plug type. In one example, the electrical parameter configuration may include one of a pole, ground, voltage, and current parameters. The plug types having configurations that include more, fewer, or different parameters are also contemplated.

As some non-limiting examples, the detected plug type be a plug having a first electrical parameter configuration including 125V/15 A two-pole and three-wire grounding output, a second electrical configuration including 125V/20 A two-pole and three-wire grounding output, a third electrical configuration including 125V/50 A two-pole and three-wire grounding output, a fourth electrical configuration including 250V/15 A two-pole and three-wire grounding output, a fifth electrical configuration including 250V/50 A three-pole and four-wire grounding output, a sixth electrical parameter configuration including 125V/30 A two-pole and three-wire grounding output, a seventh electrical parameter configuration including 125V-250V/20 A three-pole and four-wire grounding output, an eighth electrical configuration including 125V-250V/30 A three-pole and four-wire grounding output, a ninth electrical parameter configuration including 250V/20 A three-pole and four-wire grounding output, and a tenth electrical parameter configuration including 208 VAC/20 A four-pole and five-wire grounding output.

At block 408 the reconfigurable converter 202 may initiate outputting power to the adaptor 208 connected thereto according to the electrical parameter configuration corresponding to the detected plug type. In some instances, the reconfigurable converter 202 may output power to the adaptor 208 as demanded by the electrical connector connected to the adaptor output interface 214 according to a maximum operating range specified by the corresponding electric parameter configuration. Accordingly, the reconfigurable converter 202 may be configured to output power requested by the electrical connected through the adaptor output interface 214 that is less than the maximum operating range of the plug type specified by the corresponding electric parameter configuration.

The reconfigurable converter 202, at block 410, determines whether an electrical fault has been detected. In one example, the converter 202 may receive one or more signals from the adaptor 208 connected thereto that indicate a ground fault. As some examples, a ground fault circuit interrupt (GFCI) and circuit protection device 212 electrically connected between the adaptor input interface 222 and the adaptor output interface 214 may be configured to detect when current flow through the device 212 is greater than a threshold. At block 412 the reconfigurable converter 202 may issue a fault notification responsive to detecting that a ground fault occurred. The reconfigurable converter 202 may then, at block 416, interrupt power output to the adaptor 208 connected thereto and, at block 418, may enter a standby mode.

Additionally or alternatively, responsive to confirming absence of an electrical fault, the reconfigurable converter 202 at block 414 determines whether a manual request to disable power output has been received. The converter 202 may return to block 408, responsive to confirming an absence of a manual request to disable output power, and may continue outputting power to the connected adaptor 208 according to the electrical parameter configuration corresponding to the detected plug type and/or as demanded by the electrical connector connected to the adaptor output interface 214 according to a maximum operating range specified by the corresponding electric parameter configuration. Responsive to detecting a manual request to disable output power, the reconfigurable converter 202, at block 416, may interrupt electrical connection between the converter interface 220 and the adaptor interface 222 to interrupt the flow of energy from the vehicle 102 to an electrical load external to the vehicle 102.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various Changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine;
   a traction battery configured to power the electric machine; and
   a converter configured to
      responsive to a first signal from a first adaptor indicating a first plug type having a first electrical parameter configuration, output power from the traction battery to the first adaptor according to the first electrical parameter configuration, and
      responsive to a second signal from a second adaptor indicating a second plug type having a second electrical parameter configuration, output power from the traction battery to the second adaptor according to the second configuration.

2. The vehicle of claim 1, wherein the first electrical parameter configuration and the second electrical parameter configuration include one of a pole, ground, voltage, and current different from one another.

3. The vehicle of claim 2, wherein each of the first and second configurations defines an operating range of an electric load powered via the plug type.

4. The vehicle of claim 1, wherein the first electrical parameter configuration and the second electrical parameter configuration include a pole, ground, and voltage that are same and current that is different.

5. The vehicle of claim 1, wherein the converter is further configured to issue a fault notification and interrupt the outputting of power responsive to a ground fault interrupt.

6. A system for a vehicle comprising:
   a converter configured to, responsive to different signals from different types of adaptors installed at different times, each adaptor defining a different corresponding plug type and a different corresponding electrical configuration from those of one another, output power from a traction battery according to both the corresponding plug type and the corresponding electrical configuration of the adaptor.

7. The system of claim 6, wherein each electrical configuration includes a combination of a number of poles, voltage, and current different from that of other electrical configurations.

8. The system of claim 7, wherein one of the combinations is a two-pole three-wire grounding 125-V and 15-A output and another combination is a fear-pole five-wire grounding 208-VAC and 20-A output.

9. The system of claim 6, wherein the converter is further configured to issue a fault notification and interrupt the outputting of power responsive to a ground fault interrupt.

10. A vehicle comprising:
    an electric machine;
    a traction battery configured to power the electric machine; and
    a voltage converter defining a connection interface configured to electrically couple the converter to corresponding interfaces of each of different types of smart adaptors, each of the smart adaptors defining a different corresponding electrical configuration such that, responsive to receiving different signals from different ones of the smart adaptors connected to the converter at different times, the converter outputs power from the traction battery according to the corresponding electrical configuration of the one of the smart adaptors that is currently connected to the converter.

11. The vehicle of claim 10, wherein the electrical configuration includes one of a pole, ground, voltage, and current different from one another.

12. The vehicle of claim 11, wherein one of the configurations is a two-pole three-wire grounding 125-V and 15-A output and another configuration is a four-pole five-wire grounding 208-VAC and 20-A output.

13. The vehicle of claim 11, wherein the electrical configuration includes one of the pole, ground, voltage, and current that are same with one another.

14. The vehicle of claim 13, wherein one of the configurations is a two-pole three-wire grounding 125-V and 15-A output and another configuration is a two-pole three-wire grounding 125-V and 20-A output.

* * * * *